US 6,325,593 B1

(12) United States Patent
Darkins, Jr. et al.

(10) Patent No.: US 6,325,593 B1
(45) Date of Patent: Dec. 4, 2001

(54) CERAMIC TURBINE AIRFOILS WITH COOLED TRAILING EDGE BLOCKS

(75) Inventors: Toby G. Darkins, Jr.; Monty L. Shelton, both of Loveland; Roger L. Doughty, Cincinnati; Mark E. Noe, Morrow, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/507,407

(22) Filed: Feb. 18, 2000

(51) Int. Cl.⁷ ........................................ F01D 5/14
(52) U.S. Cl. .......................... 415/115; 416/97 R
(58) Field of Search .................. 415/115, 176, 415/178; 416/97 R, 96 A, 241 B

(56) References Cited

U.S. PATENT DOCUMENTS

| | | |
|---|---|---|
| 3,819,295 | 6/1974 | Hauser et al. . |
| 4,006,999 | 2/1977 | Brantley et al. . |
| 4,324,843 * | 4/1982 | Brennan et al. ............... 428/697 |
| 4,437,810 | 3/1984 | Pearce . |
| 4,705,455 | 11/1987 | Sahm et al. . |
| 4,767,261 | 8/1988 | Godfrey et al. . |
| 5,102,299 | 4/1992 | Frederick . |
| 5,271,715 * | 12/1993 | Zelesky et al. ............... 416/97 R |
| 5,288,207 | 2/1994 | Linask . |
| 5,355,668 | 10/1994 | Weil et al. . |
| 5,516,260 | 5/1996 | Damlis et al. . |
| 5,630,700 | 5/1997 | Olsen et al. . |
| 5,667,359 * | 9/1997 | Huber et al. ............... 416/96 A |
| 5,720,431 | 2/1998 | Sellers et al. . |
| 5,931,638 * | 8/1999 | Krause et al. ............... 416/97 R |
| 6,077,036 * | 6/2000 | Heffron et al. ............... 415/115 |
| 6,102,658 * | 8/2000 | Kvasnak et al. ............... 416/97 R |
| 6,126,397 * | 10/2000 | Kvasnak et al. ............... 416/97 R |
| 6,129,515 * | 10/2000 | Soechting et al. ............... 416/97 R |

* cited by examiner

Primary Examiner—Edward K. Look
Assistant Examiner—Ninh Nguyen
(74) Attorney, Agent, or Firm—Andrew C. Hess; Rodney M. Young

(57) ABSTRACT

A gas turbine engine hollow turbine airfoil, such as a first stage vane of a high pressure turbine of a gas turbine engine includes an outer wall surrounding a hollow interior. The outer wall extends radially outwardly in a spanwise direction from an airfoil base to an airfoil tip and has chordwise spaced apart leading and trailing edges and widthwise spaced apart pressure and suction side portions extending chordwise between the leading edge and a trailing edge block which terminates at the trailing edge. A plurality of trailing edge cooling air ducts extend chordwise through the trailing edge block aftwardly from the hollow interior and a plurality of trailing edge film cooling holes extend from the ducts through the trailing edge block. The cooling air ducts are preferably centered near a neutral axis of chordwise and spanwise bending of the trailing edge block. The trailing edge cooling air ducts converge aftwardly from the hollow interior and preferably converge in width with a substantially constant spanwise height. The invention is particularly suitable for turbine airfoils and vanes made with a ceramic matrix composite material such as one having a SiC matrix and, more particularly, with an SiC—SiC ceramic matrix composite. The airfoil is disposed between radially inner and outer segmented platforms that are, in one embodiment, integrally formed of a ceramic matrix composite (CMC) preferably a SiC—SiC CMC.

38 Claims, 11 Drawing Sheets

CERAMIC TURBINE AIRFOILS WITH COOLED TRAILING EDGE BLOCKS

BACKGROUND OF THE INVENTION

The Government has rights to this invention pursuant to a contract by the United States Air Force.

FIELD OF THE INVENTION

This invention relates to cooling of gas turbine engine turbine vanes and blades and, more particularly, to film cooling of airfoil trailing edges of ceramic vanes and blades.

DISCUSSION OF THE BACKGROUND ART

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example. A turbine stage includes a row of turbine rotor blades secured to the outer perimeter of a rotor disk, with a stationary turbine nozzle having a plurality of stator vanes disposed upstream therefrom. The combustion gases flow between the stator vanes and between the turbine blades for extracting energy to rotate the rotor disk.

The blades and vanes often include airfoils with hollow interiors extending between leading and trailing edges of the airfoil. Cooling air is flowed into the hollow interior for internal cooling of the airfoil and flowed out through film cooling holes for external cooling of the airfoil. The temperatures within gas turbines may exceed 2500 degrees Fahrenheit, and cooling of turbine vane and blade airfoils is very important in terms of vane and blade longevity. Without cooling, turbine vane and blade airfoils would rapidly deteriorate. Improved cooling for turbine airfoils is very desirable and much effort has been devoted by those skilled in the blade cooling arts to devise improved cooling designs in order to enhance cooling. The turbine vanes and blades are typically cooled with a portion of compressor air bled from the compressor for this purpose. Diverting any portion of the compressor air necessarily decreases the overall efficiency of the engine. Accordingly, it is desired to cool the vanes and blades with as little compressor bleed air as possible.

Different cooling passage configurations may be used within the hollow interior of the airfoil. Straight pass through of cooling air or impingement cooling air using impingement baffles are two types of cooling configurations used within the hollow interior to cool the airfoil. Film cooling air is discharged from the hollow interior through various film cooling holes disposed around the leading edge and mid-chord areas of the outer surface of the airfoil.

Since the overall efficiency of the gas turbine engine is directly related to the temperature of the combustion gases, engine efficiency is limited by the ability to operate the turbine nozzle at high temperature. Conventional turbine vane and blade materials are superalloys, such as single crystal nickel based materials, which have allowed engines to be operated at relatively high thermal efficiency. Further advances in engine efficiency by increasing combustion gas temperature has led to development of a class of high temperature ceramic materials one particular useful class of which is referred to as ceramic matrix composite (CMC) which have substantially higher temperature capabilities than conventional superalloys. CMC materials also maintain strength at relatively higher temperatures than that of conventional superalloys.

However, ceramic materials are relatively brittle when compared to conventional superalloys with a corresponding loss of toughness inherent therein. These materials also have substantially different coefficients of thermal expansion, or different thermal conductivities, compared to conventional superalloys. Advanced military engines are being designed to operate under conditions that require the trailing edge to operate with greater pressure loading, about twice that of modern commercial engines. High internal pressures required to cool turbine airfoils cause ballooning stresses at the trailing edge and high pressure loading across the turbine vane causes spanwise and chordwise bending loads for which a nearly solid trailing edge provides adequate structural strength. A problem is having enough structural integrity at the trailing edge while still being able to deliver cooling flow out the trailing edge as well as bleed flow to maintain film cooling. Low strain to failure ratio materials that are brittle such as ceramics offer very good thermal characteristics. SiC—SiC, a ceramic matrix composite (CMC) material, is being considered for use for turbine vanes because of its high temperature capability. The SiC—SiC CMC is a ceramic and has a very low failure strain level and consequently, a relatively low design stress when compared to typical Ni based super alloys.

An improved turbine airfoil and nozzle vane configuration is required that provides sufficient strength and cooling characteristics to meet the stress and temperature requirements in a high temperature and pressure environment and use ceramic materials that are characterized by a low thermal gradient capability.

SUMMARY OF THE INVENTION

A gas turbine engine hollow turbine airfoil suitable for use in a turbine vane includes an outer wall surrounding a hollow interior. The airfoil has pressure and suction sides extending aftwardly in a chordwise direction from a leading edge to a trailing edge. The outer wall extends radially outwardly in a spanwise direction from an airfoil base to an airfoil tip and widthwise spaced apart pressure and suction side portions extending chordwise between the leading edge and a trailing edge block. The trailing edge block extends aftwardly from the hollow interior and terminates at the trailing edge, a plurality of trailing edge cooling air ducts extend chordwise through the trailing edge block aftwardly from the hollow interior, and a plurality of trailing edge film cooling holes extend from the ducts through the trailing edge block. The cooling air ducts are preferably centered along or near a neutral axis of chordwise and spanwise bending of the trailing edge block. The invention is particularly suitable for turbine airfoils and vanes made with a ceramic matrix composite material such as one having a SiC matrix and, more particularly, with an SiC—SiC ceramic matrix composite. The trailing edge cooling air ducts converge aftwardly from the hollow interior. In a more particular embodiment, the trailing edge cooling air ducts converge in width and have a substantially constant spanwise height.

The invention includes, but is not limited to, three embodiments with means for terminating the trailing edge cooling air ducts. In the first embodiment, the trailing edge cooling air ducts extend aftwardly from the hollow interior completely through the trailing edge block. In the second embodiment, the trailing edge cooling air ducts terminate within the trailing edge block forward of the trailing edge. In the third embodiment, throttling holes extend from the trailing edge cooling air ducts, which terminate within the block, aftwardly completely through the trailing edge block. The trailing edge cooling air ducts have substantially constant spanwise heights and converging cross-sectional widths perpendicular to a span of the airfoil that converge in an aftwardly chordwise direction from the hollow interior.

In one more particular embodiment, the trailing edge block has a block spanwise bow wherein the trailing edge block is bowed outwardly in a normal direction to the pressure side of the airfoil. The block spanwise bow is preferably graduated in the chordwise direction to minimize bending of the airfoil trailing edge block near the trailing edge. The trailing edge is preferably bowed outwardly in a generally aftwardly chordwise direction.

The airfoil of the present invention is particularly suitable in a vane for a gas turbine engine such as the first stage of a high pressure turbine. The vane includes the hollow airfoil disposed between radially inner and outer segmented platforms that are integrally formed of a ceramic matrix composite (CMC) preferably a SiC—SiC CMC.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
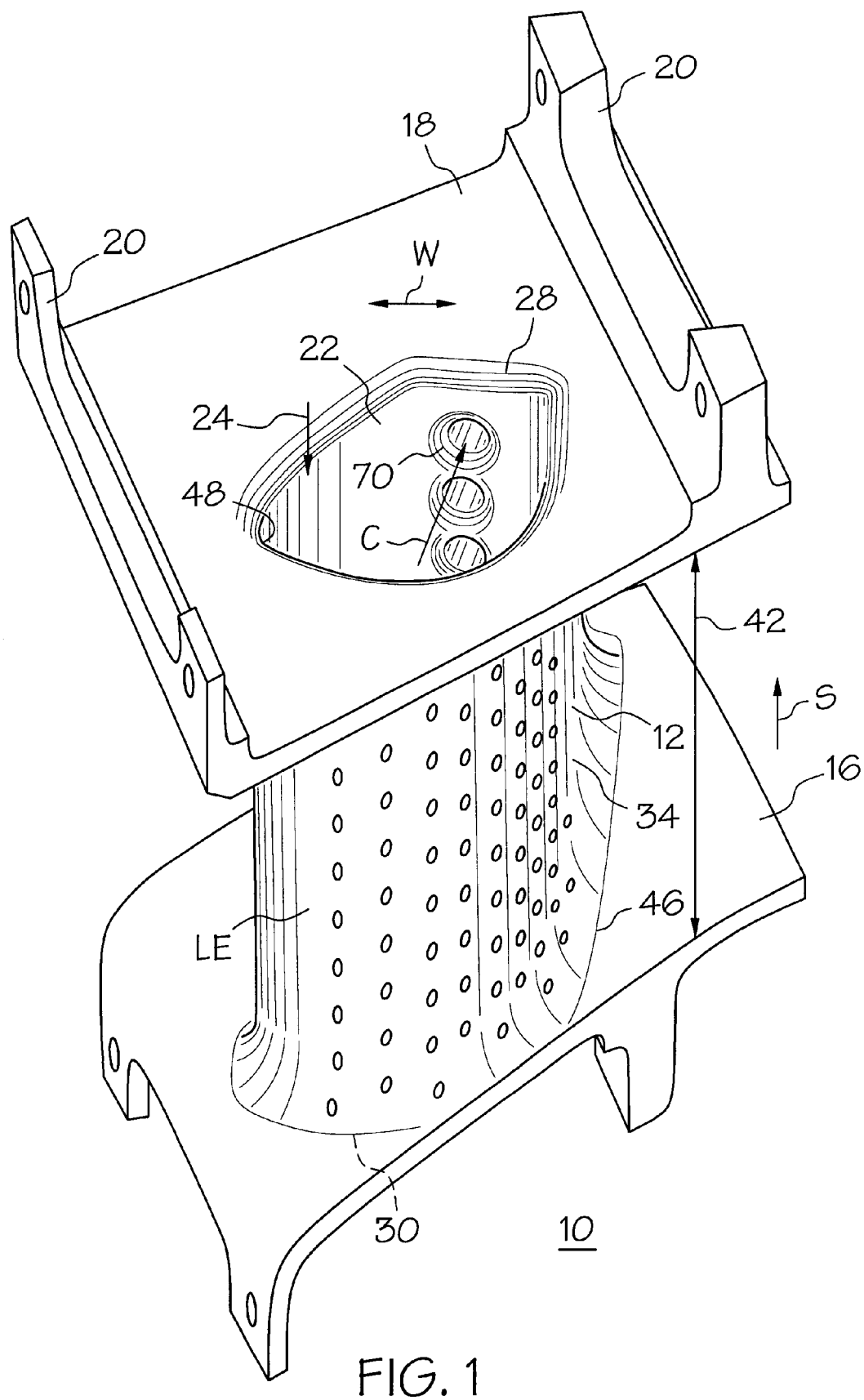
FIG. 1 is a perspective view illustration of a gas turbine engine turbine vane illustrating a first exemplary embodiment of the invention.
Figure 2:
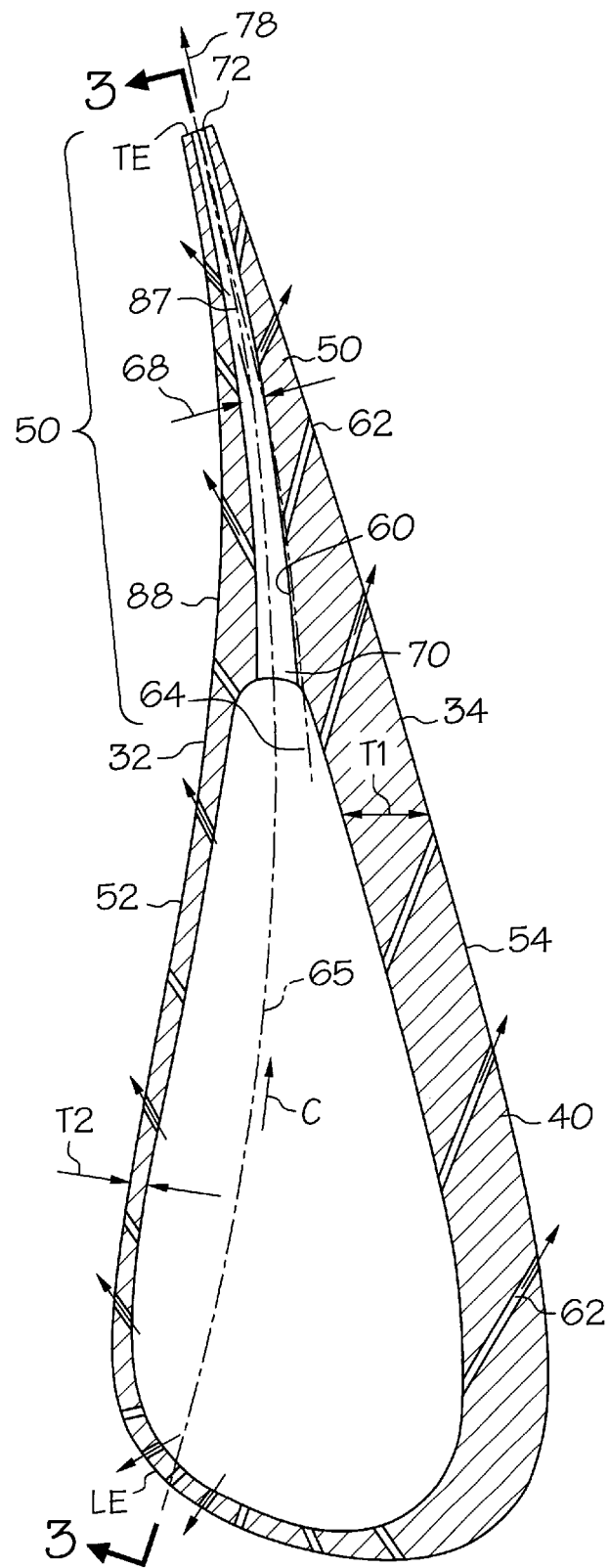
FIG. 2 is a sectional schematic illustration of an airfoil cross-section through line 2—2 of an airfoil of the vane in FIG. 3.

Illustrated in FIGS. 1 and 2 is a turbine vane 10 that has particular use in a first stage high pressure turbine section in a gas turbine engine and includes at least one hollow airfoil 12 extending radially between arcuate radially inner and outer segmented platforms 16 and 18 formed integrally therewith. The platforms are provided with mounting flanges 20 which support the vane 10 from fixed structure of the engine. The hollow airfoil 12 has a hollow interior 22 for receiving cooling air 24. The hollow interior 22 is schematically illustrated as a single pass cooling air circuit in the exemplary embodiment illustrated herein with the cooling air 24 flowing from a radially outer opening 28 to a radially inner opening 30 of the airfoil 12.

The vanes 10 including the hollow airfoil 12, inner and outer segmented platforms 16 and 18, and mounting flanges 20 are integrally formed of a low strain to failure ratio material, such as a ceramic or ceramic matrix composite (CMC) such as a SiC—SiC CMC, a silicon infiltrated silicon carbide composite reinforced with coated silicon carbide fibers. The ceramic material may be a monolithic ceramic material such as SiC. These ceramic materials are characterized by a low thermal gradient capability.

The airfoil 12 has an outer wall 40 with a span 42 extending radially outwardly in a spanwise direction S from an airfoil base 46 at the inner segment platform 16 to an airfoil tip 48 at the outer segmented platform 18. The airfoil 12 includes pressure and suction sides 32 and 34, respectively, extending in a chordwise direction (denoted as along a chord C) between spaced apart leading and trailing edges LE and TE, respectively. The outer wall 40 has widthwise (widthwise direction denoted as W perpendicular to the chord C) spaced apart pressure and suction side portions 52 and 54, respectively, extending chordwise between the leading edge LE and a trailing edge block 50. The trailing edge block 50 extends from the hollow interior 22 to the trailing edge TE where it terminates. The trailing edge block 50 is nearly solid because high internal pressures of the cooling air 24 inside the hollow interior 22 causes ballooning stresses at the trailing edge portion represented by the block. This high pressure loading across the airfoil causes spanwise and chordwise bending loads that necessitate a nearly solid trailing edge portion of the airfoil. The suction side portion 54 has a first thickness T1 substantially greater than a pressure wall second thickness T2 of the pressure side portion 52 because at operating conditions a first pressure drop across the suction side portion 54 is substantially greater than a second pressure drop across the pressure side portion 52.

A plurality of trailing edge cooling air ducts 60 extend chordwise through the trailing edge block 50 aftwardly from the hollow interior 22 and a plurality of trailing edge film cooling holes 62 extend from the ducts through the trailing edge block. Film cooling holes 62 are also disposed through the pressure and suction side portions 52 and 54 of the outer wall. The cooling air ducts 60 are preferably centered along or near a neutral axis 64 of chordwise and spanwise bending of the trailing edge block 50. As used herein, the neutral bending axis is defined as the locus of points defining a plane of the trailing edge block 50 which will experience zero stress under chordwise and/or spanwise bending. Typically, the neutral axis 64 will approximate an airfoil mean line 65 and is determinable by known methods. The exemplary embodiment illustrated herein shows the neutral axis 64 near the mean line 65.

Figure 3:
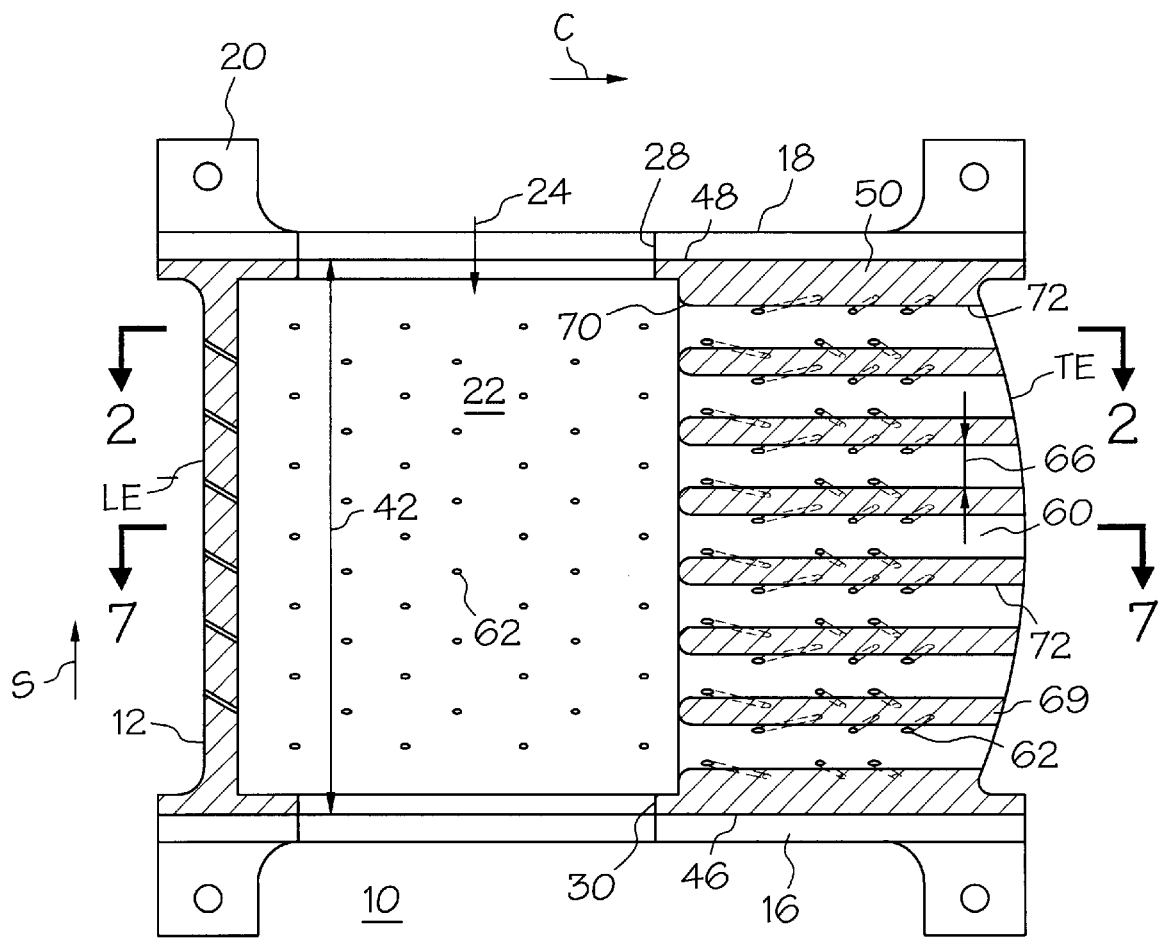
FIG. 3 is a sectional schematic illustration through the vane in FIG. 1 which is laid out flat along a mean line through the vane illustrating cooling air ducts in the trailing block terminating at the trailing edge of the airfoil.
Figure 4:
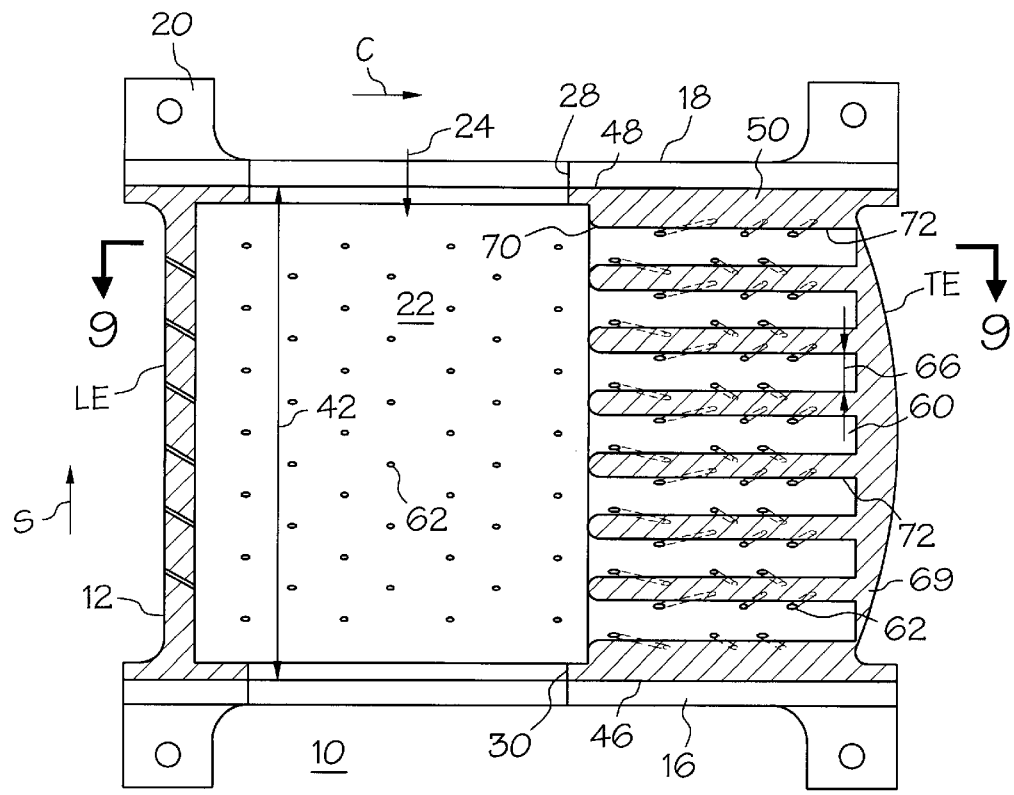
FIG. 4 is a sectional schematic illustration of a second embodiment of the vane in FIG. 1 which is laid out flat along a mean line through the vane illustrating cooling air ducts in the trailing block terminating within the block forward of the trailing edge of the airfoil.
Figure 5:
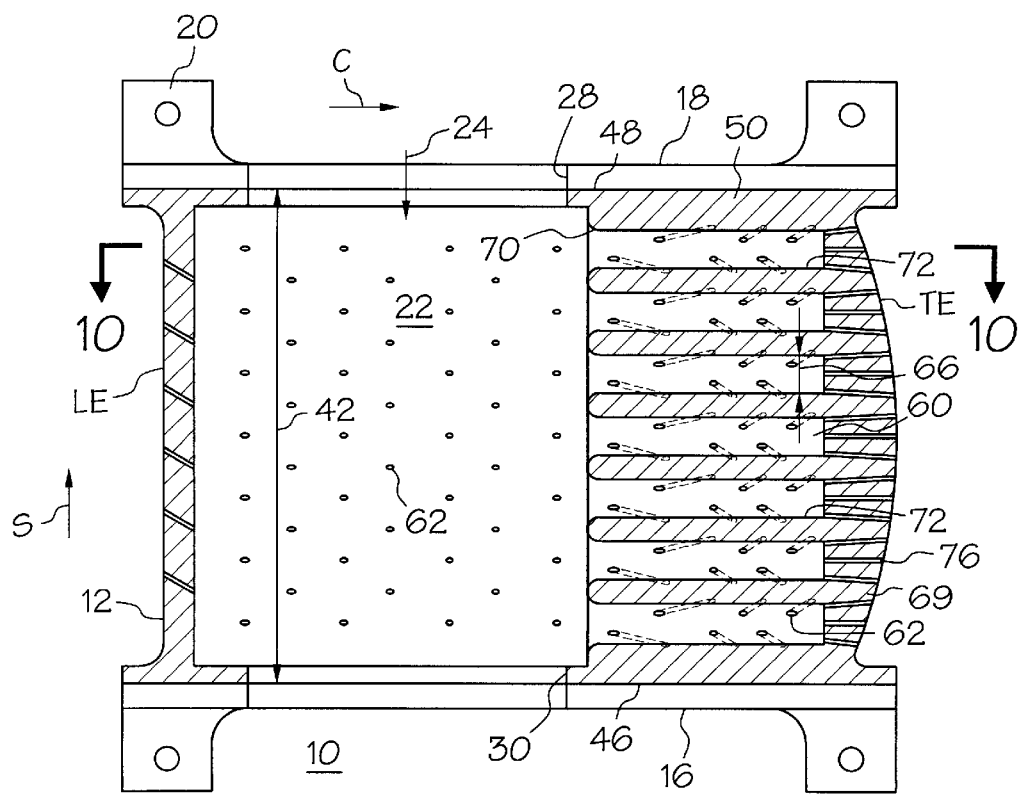
FIG. 5 is a sectional schematic illustration of a third embodiment of the vane in FIG. 1 which is laid out flat along a mean line through the vane illustrating cooling air ducts in the trailing block terminating within the block forward of the trailing edge of the airfoil and having throttling holes to purge cooling air from the ducts out the trailing edge.
Figure 12:
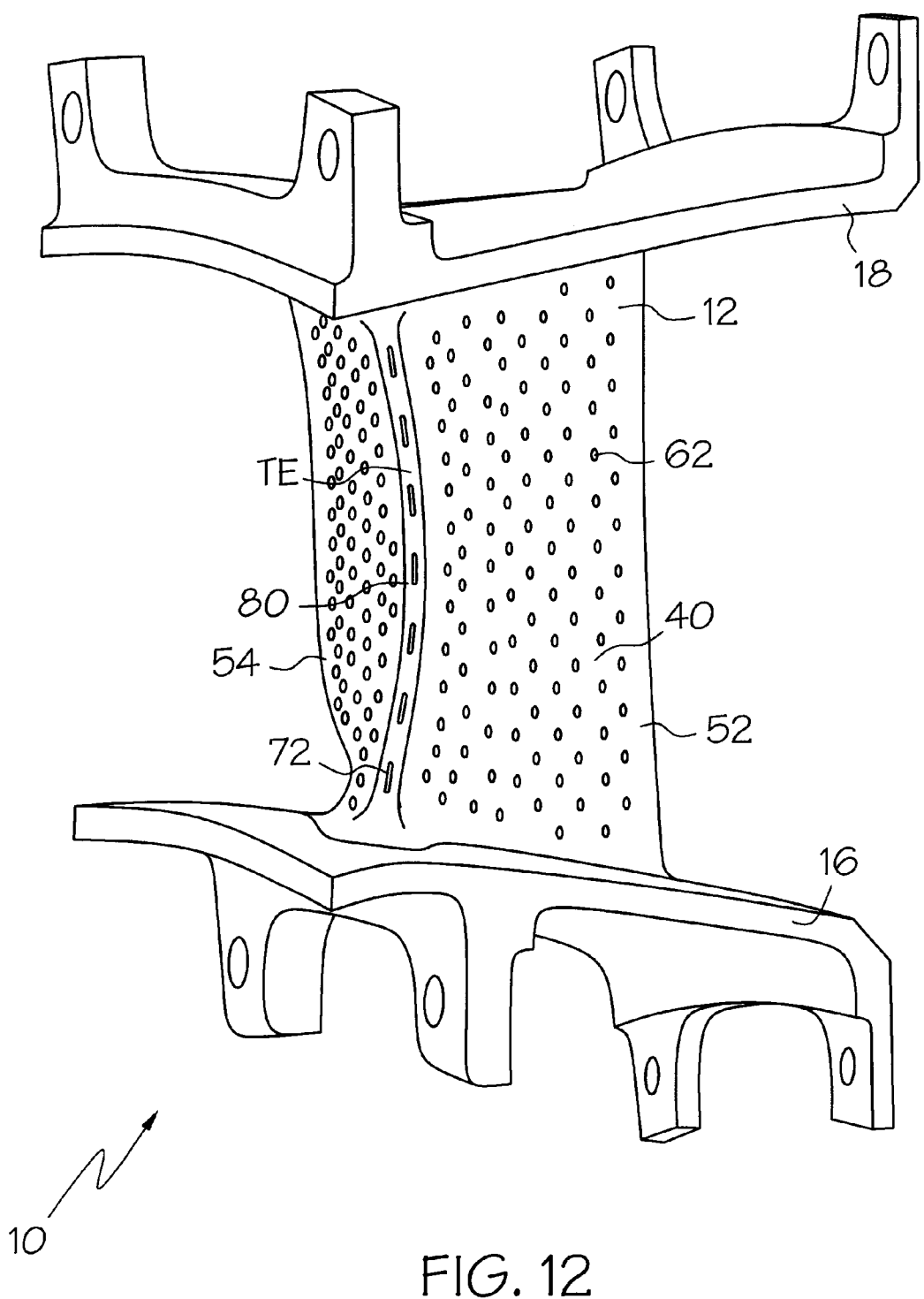
FIG. 12 is an aft looking forward perspective view illustration of the gas turbine engine turbine vane in FIG. 3 illustrating ovalized cooling air duct outlets at the trailing edge of the airfoil.

The trailing edge cooling air ducts 60 converge in an aftwardly chordwise direction from the hollow interior 22. Preferably, the trailing edge cooling air ducts 60 converge in width only such that they have substantially constant spanwise heights 66, as illustrated in FIGS. 3, 4, and 5, and converging cross-sectional widths 68 that are perpendicular to the span 42 of the airfoil 12 as illustrated in FIG. 2. The substantially constant spanwise heights 66 of the air ducts 60 provide a maximum amount of inter-duct material 69 between the air ducts in the trailing edge block 50 which helps to resist the high pressure loading across the airfoil and the resulting large spanwise and chordwise bending loads. The cooling air ducts 60 have filleted round inlets 70 and because they converge in width only they have oval or race track shaped outlets 72 as illustrated in FIG. 12. The cooling air ducts 60 gradually transition in shape between the inlets 70 and the outlets 72. The converging cooling air ducts 60 are designed to provide sufficient pressure of the cooling air 24 inside the ducts to provide film cooling through the trailing edge film cooling holes 62 through the trailing edge block 50. They are also designed to provide flow rates of the cooling air 24 that result in substantially constant heat transfer cooling surface area and lower cooling heat flux levels, which benefits the CMC material which has generally lower stress capabilities for through wall temperature gradients. This provides good heat transfer loading for the trailing edge block 50 with both effective internal convection through the film cooling holes 62 and good external film cooling to maintain the temperature limits of the CMC material in the block.

The invention, thus, provides sufficient and substantial structural integrity at the trailing edge block 50 while still being able to deliver cooling air 24 out the film cooling holes 62 in the trailing edge block as well as bleed flow 78 to maintain film cooling. Structurally, the cooling air ducts 60 are near the neutral axis 64 of chordwise and spanwise bending of the trailing edge block 50. From a structural standpoint, the cooling air ducts 60 should be as dose as possible to the neutral axis 64. The amount of inter-duct material 69 between the air ducts in the trailing edge block 50 allows the transverse shear stresses from bending to be transferred from the thinner pressure side portion 52 to the thicker suction side portion 54, which because of its greater thickness, has greater load bearing capability than the pressure side portion. This greatly enhances the structural integrity of and cooling air delivery to the trailing edge block 50 which is made of low strength and low ductility materials such as SiC—SiC CMCs.

The invention includes, but is not limited to, three embodiments of designs for terminating the trailing edge cooling air ducts 60. Illustrated in FIGS. 2 and 3 is the first embodiment in which the trailing edge cooling air ducts 60 extend aftwardly from the hollow interior 22 completely through the trailing edge block 50 ending at outlets 72 as described above. In the second embodiment illustrated in FIG. 4, the trailing edge cooling air ducts 60 terminate within the trailing edge block forward of the trailing edge TE. All of the cooling air 24 inside the ducts 60 is used to provide film cooling through the trailing edge film cooling holes 62 through the trailing edge block 50. In the third embodiment illustrated in FIG. 5, throttling holes 76 extend from the trailing edge cooling air ducts 60, which terminate within the block, aftwardly completely through the trailing edge block 50.

Figure 6:
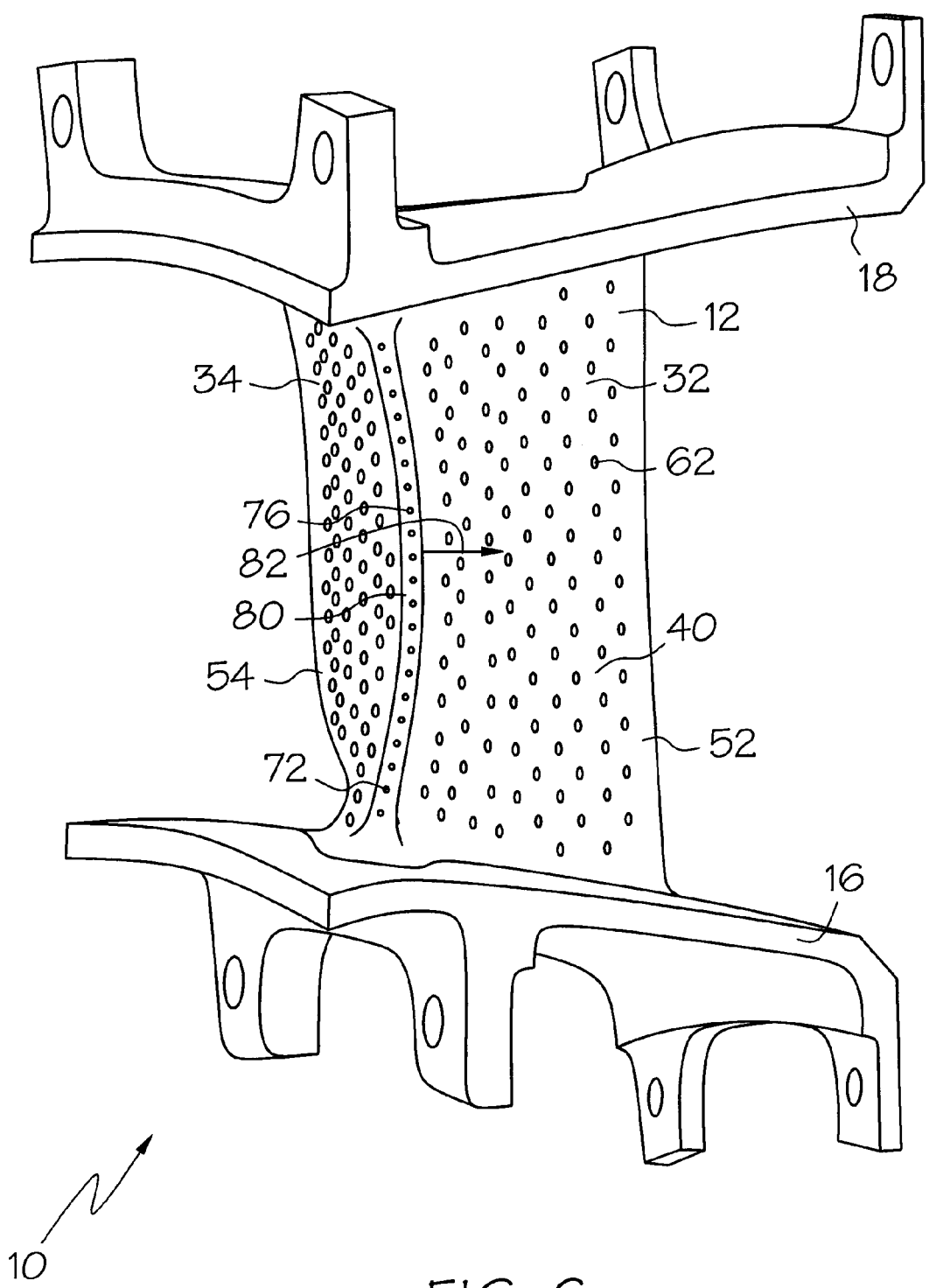
FIG. 6 is an aft looking forward perspective view illustration of the gas turbine engine turbine vane in FIG. 1 illustrating a bowed block bowed outward in a direction faced by a pressure side of the airfoil.
Figure 7:
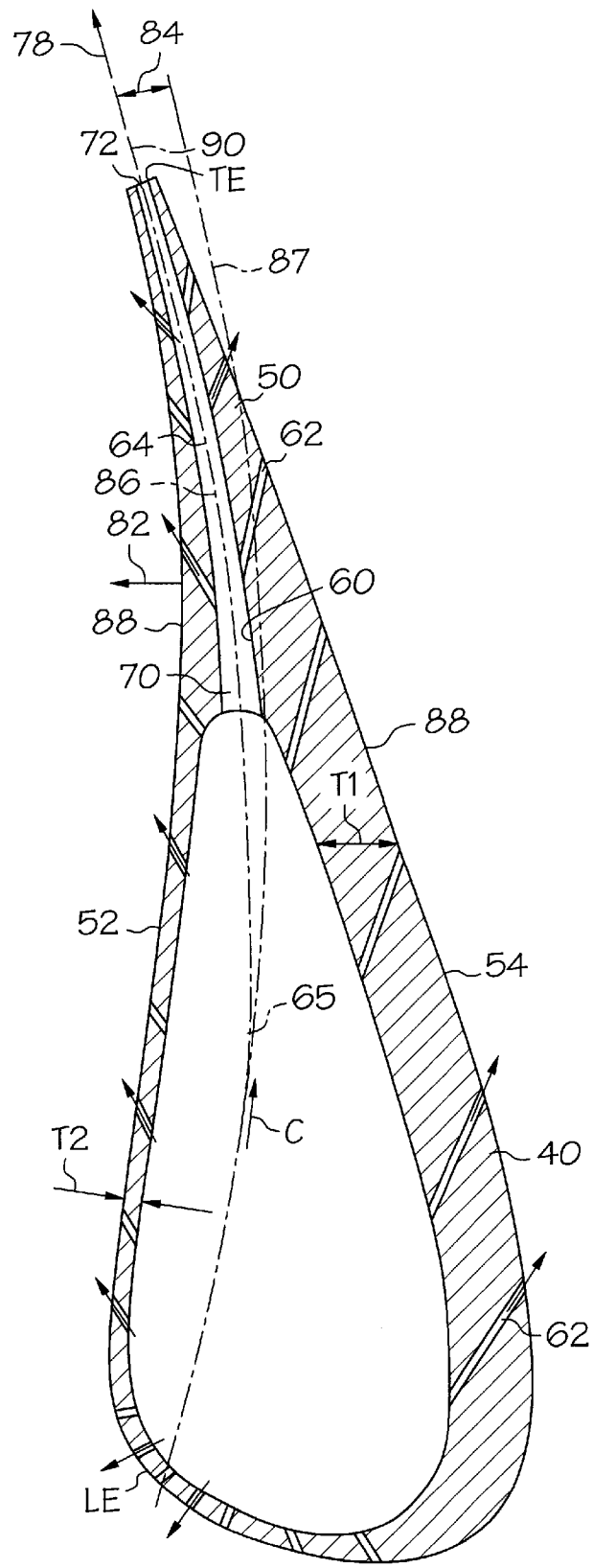
FIG. 7 is a sectional schematic illustration of a mid-span airfoil cross-section through line 7—7 of the airfoil of the vane in FIG. 3 and illustrates bowing of a trailing edge block of the airfoil.

Illustrated in FIGS. 6 and 7 is the trailing edge block 50 having a block bow 80 wherein the trailing edge block is bowed outwardly in a normal direction 82 to the pressure side portion 52 of the outer wall 40. The bowing is formed by a rotation 84 of the trailing edge block 50 as can be seen in FIG. 7 by a rotated portion 86 of the mean line 65 from an un-rotated portion 87 of the airfoil along an airfoil cross-section 88 near the base 46 or tip 48 of the airfoil 12. The block bow 80 is preferably graduated in the chordwise direction and the block has a maximum amount 90 of rotation 84 at the trailing edge TE as measured between the rotated portion 86 of the mean line 65, through the trailing edge block 50, from the un-rotated portion 87 of the mean line 65 of the airfoil along an airfoil cross-section 88 near the base 46 or tip 48 of the airfoil 12. Bowing of the trailing edge block 50 outwardly in a normal direction 82 to the pressure side portion 52 of the outer wall 40 provides additional structural capability to resist bending moments due to differential pressures between the pressure and suction side portion 52 and 54 of the airfoil outer wall. The trailing edge is preferably bowed outwardly in a generally aftwardly chordwise direction to provide additional aerodynamic efficiency.

Figure 8:
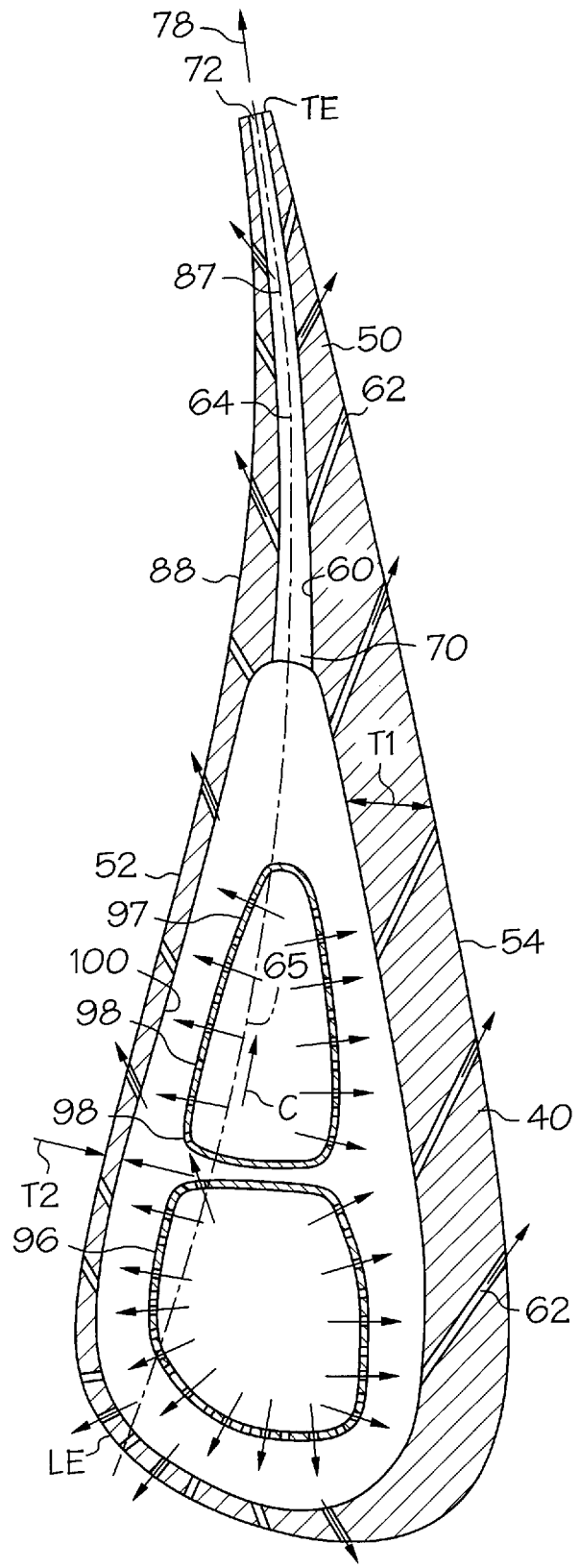
FIG. 8 is a sectional schematic illustration of an airfoil cross-section through line 2—2 of an airfoil of the vane in FIG. 3 with impingement cooling baffles inside a hollow interior of the airfoil.
Figure 9:
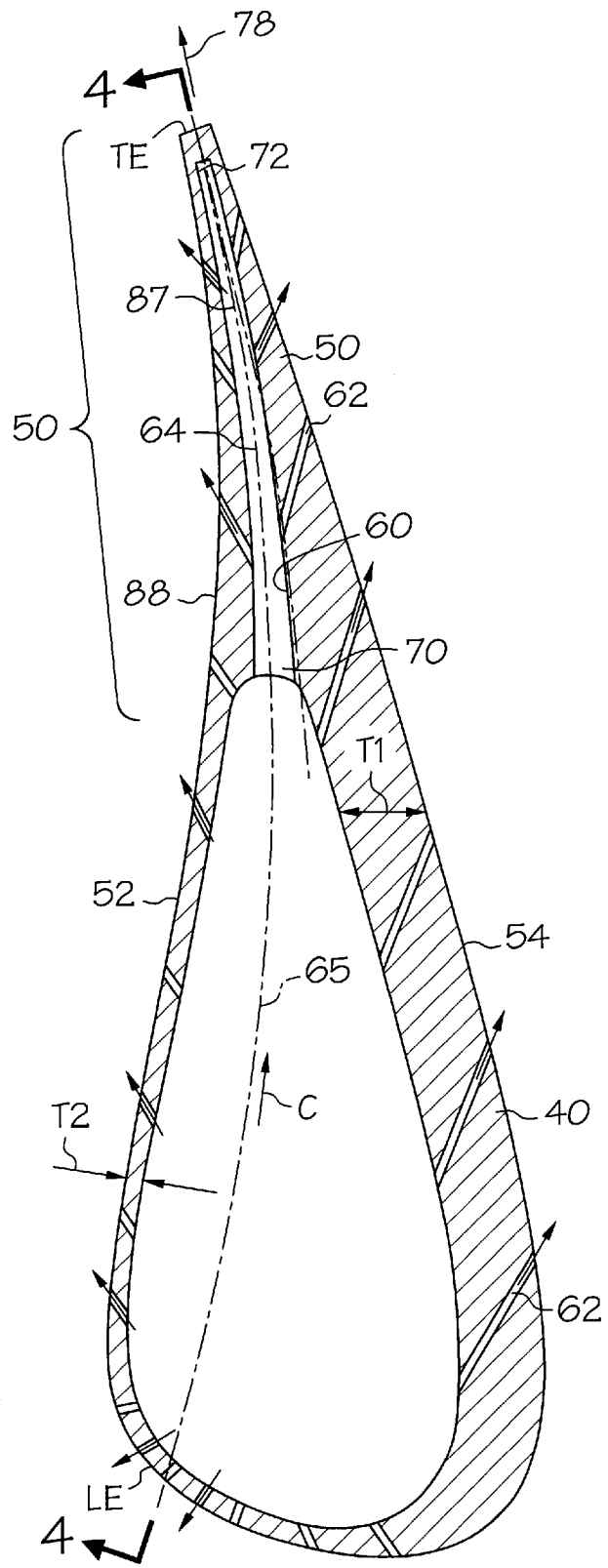
FIG. 9 is a sectional schematic illustration of an airfoil cross-section through line 9—9 of an airfoil of the vane in FIG. 4.
Figure 10:
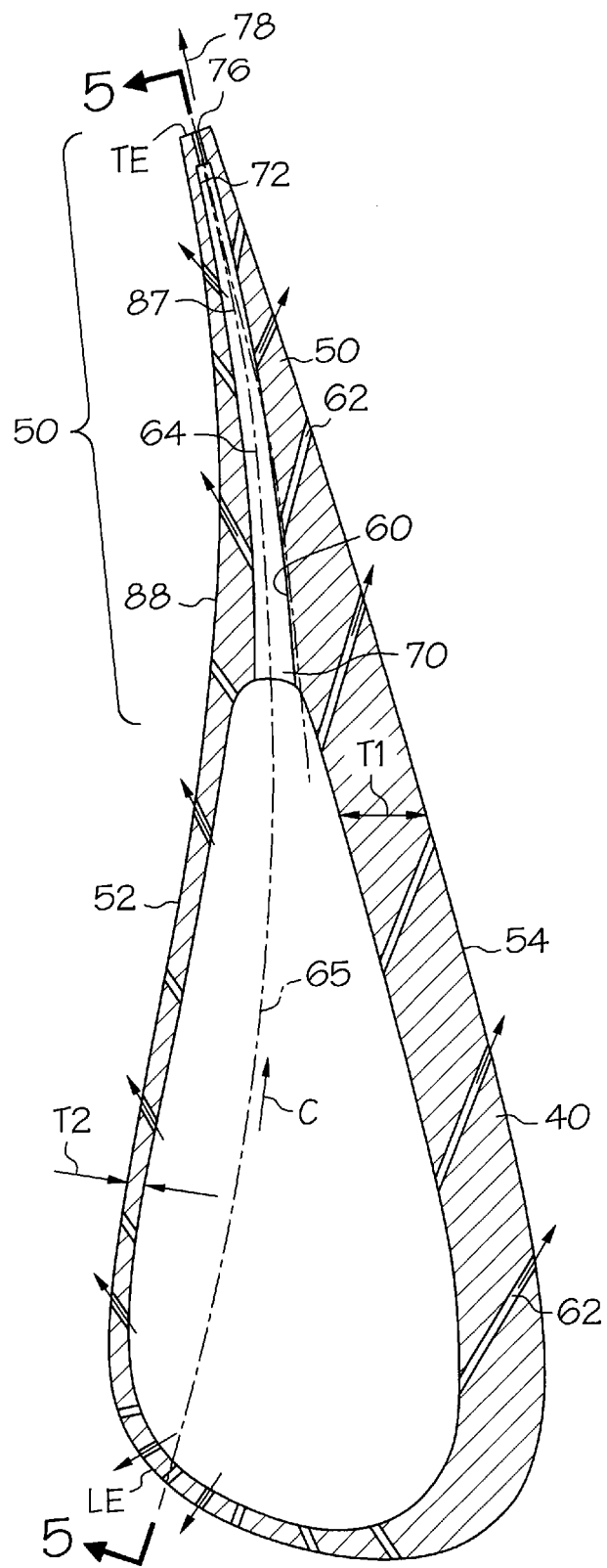
FIG. 10 is a sectional schematic illustration of an airfoil cross-section through line 10—10 of an airfoil of the vane in FIG. 5.
Figure 11:
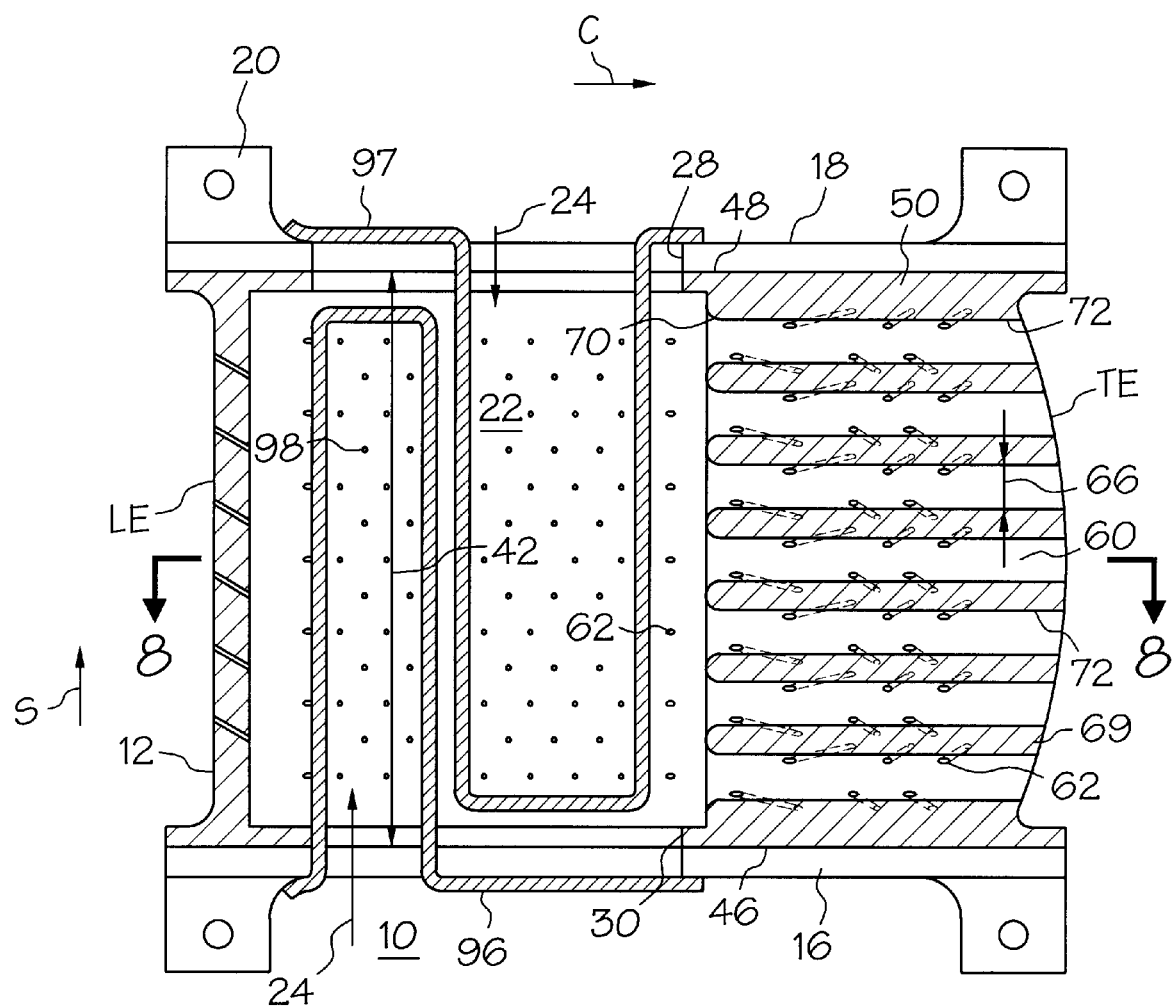
FIG. 11 is a sectional schematic illustration through the vane in FIG. 1 which is laid out flat along a mean line through the vane illustrating an alternative embodiment of the invention with impingement baffles used for supplying cooling air to the hollow interior of the airfoil.

FIGS. 8 and 11 illustrate first and second impingement cooling baffles 96 and 97 respectively within the hollow interior 22 of the airfoil 12. Impingement cooling holes 98 impinge cooling air 24 on inside surfaces 100 of the outer wall 40 of the airfoil 12. The baffles 96 and 97 schematically illustrate one possible alternative cooling air circuit to provide cooling air to pass through the film cooling holes 62 in the outer wall 40 surrounding the hollow interior 22.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine hollow turbine airfoil comprising:
   an outer wall surrounding a hollow interior;
   said outer wall extending radially outwardly in a spanwise direction from an airfoil base to an airfoil tip and having chordwise spaced apart leading and trailing edges, and widthwise spaced apart pressure and suction side portions extending chordwise between said leading edge and a trailing edge block, said trailing edge block terminating at said trailing edge;
   a plurality of trailing edge cooling air ducts extending chordwise through said trailing edge block aftwardly from said hollow interior; and
   a plurality of trailing edge film cooling holes extending from said ducts through said trailing edge block.

2. An airfoil as claimed in claim 1 wherein said airfoil is made from a low strain to failure ratio material.

3. An airfoil as claimed in claim 1 wherein said airfoil is made from a ceramic matrix composite material.

4. An airfoil as claimed in claim 3 wherein said ceramic matrix composite material has a SiC matrix and SiC fiber.

5. An airfoil as claimed in claim 1 wherein said airfoil is made from a monolithic ceramic material.

6. An airfoil as claimed in claim 1 wherein said airfoil is made from a low thermal gradient capability material.

7. An airfoil as claimed in claim 1 wherein said trailing edge cooling air ducts converge aftwardly from said hollow interior.

8. An airfoil as claimed in claim 7 wherein said trailing edge cooling air ducts extend aftwardly from said hollow interior completely through said trailing edge block.

9. An airfoil as claimed in claim 7 wherein said trailing edge cooling air ducts terminate within said trailing edge block forward of said trailing edge.

10. An airfoil as claimed in claim 9 further comprising throttling holes extending from said trailing edge cooling air ducts aftwardly completely through said trailing edge block.

11. An airfoil as claimed in claim 7 wherein said trailing edge cooling air ducts have substantially constant spanwise heights and cross-sectional widths perpendicular to a span of said airfoil that converge in an aftwardly chordwise direction from said hollow interior.

12. An airfoil as claimed in claim 11 wherein said trailing edge cooling air ducts extend aftwardly from said hollow interior completely through said trailing edge block.

13. An airfoil as claimed in claim 11 wherein said trailing edge cooling air ducts terminate within said trailing edge block forward of said trailing edge.

14. An airfoil as claimed in claim 13 further comprising throttling holes extending from said trailing edge cooling air ducts aftwardly and completely through said trailing edge block.

15. An airfoil as claimed in claim 11 wherein said cooling air ducts are centered near a neutral axis of chordwise and spanwise bending of said trailing edge block.

16. An airfoil as claimed in claim 15 further comprising a block bow of said trailing edge block wherein said trailing edge block is bowed outwardly in a normal direction to said pressure side portion of said outer wall.

17. An airfoil as claimed in claim 16 wherein said block bow has a maximum amount of rotation at said trailing edge.

18. An airfoil as claimed in claim 14 wherein said trailing edge is bowed outwardly in a generally aftwardly chordwise direction.

19. An airfoil as claimed in claim 18 wherein said block bow has a maximum point of rotation from said chord at said trailing edge.

20. A gas turbine engine vane comprising:

a hollow airfoil having an outer wall surrounding a hollow interior and disposed between radially inner and outer segmented platforms;

said outer wall extending radially outwardly from an airfoil base to an airfoil tip and having chordwise spaced apart leading and trailing edges, and widthwise spaced apart pressure and suction side portions extending chordwise between said leading edge and a trailing edge block, said trailing edge block terminating at said trailing edge;

a plurality of trailing edge cooling air ducts extending chordwise through said trailing edge block aftwardly from said hollow interior; and a plurality of trailing edge film cooling holes extending from said ducts through said trailing edge block.

21. A vane as claimed in claim 20 wherein said vane is made from a ceramic matrix composite material.

22. A vane as claimed in claim 21 wherein said ceramic matrix composite material has a SiC matrix.

23. A vane as claimed in claim 20 wherein said trailing edge cooling air ducts converge aftwardly from said hollow interior.

24. A vane as claimed in claim 23 wherein said trailing edge cooling air ducts extend aftwardly from said hollow interior completely through said trailing edge block.

25. A vane as claimed in claim 23 wherein said trailing edge cooling air ducts terminate within said trailing edge block forward of said trailing edge.

26. A vane as claimed in claim 25 further comprising throttling holes extending from said trailing edge cooling air ducts aftwardly completely through said trailing edge block.

27. A vane as claimed in claim 23 wherein said trailing edge cooling air ducts have substantially constant spanwise heights and converging cross-sectional widths perpendicular to a span of said airfoil that converge in an aftwardly chordwise direction from said hollow interior.

28. A vane as claimed in claim 27 wherein said trailing edge cooling air ducts extend aftwardly from said hollow interior completely through said trailing edge block.

29. A vane as claimed in claim 27 wherein said trailing edge cooling air ducts terminate within said trailing edge block forward of said trailing edge.

30. A vane as claimed in claim 29 further comprising throttling holes extending from said trailing edge cooling air ducts aftwardly and completely through said trailing edge block.

31. A vane as claimed in claim 27 wherein said cooling air ducts are centered near a neutral axis of chordwise and spanwise bending of said trailing edge block.

32. A vane as claimed in claim 31 further comprising a block bow of said trailing edge block wherein said trailing edge block is bowed outwardly in a normal direction to said pressure side portion of said outer wall.

33. A vane as claimed in claim 32 wherein said block bow is graduated in said chordwise direction.

34. A vane as claimed in claim 33 wherein said block bow has a maximum amount of rotation along said trailing edge.

35. A vane as claimed in claim 32 wherein said trailing edge is bowed outwardly in a generally aftwardly chordwise direction.

36. A vane as claimed in claim 35 wherein said block bow has a maximum amount of rotation at said trailing edge.

37. A vane as claimed in claim 20 wherein said vane is made from a monolithic ceramic material.

38. A vane as claimed in claim 20 wherein said airfoil vane is made from a low thermal gradient capability material.

* * * * *